UNITED STATES PATENT OFFICE.

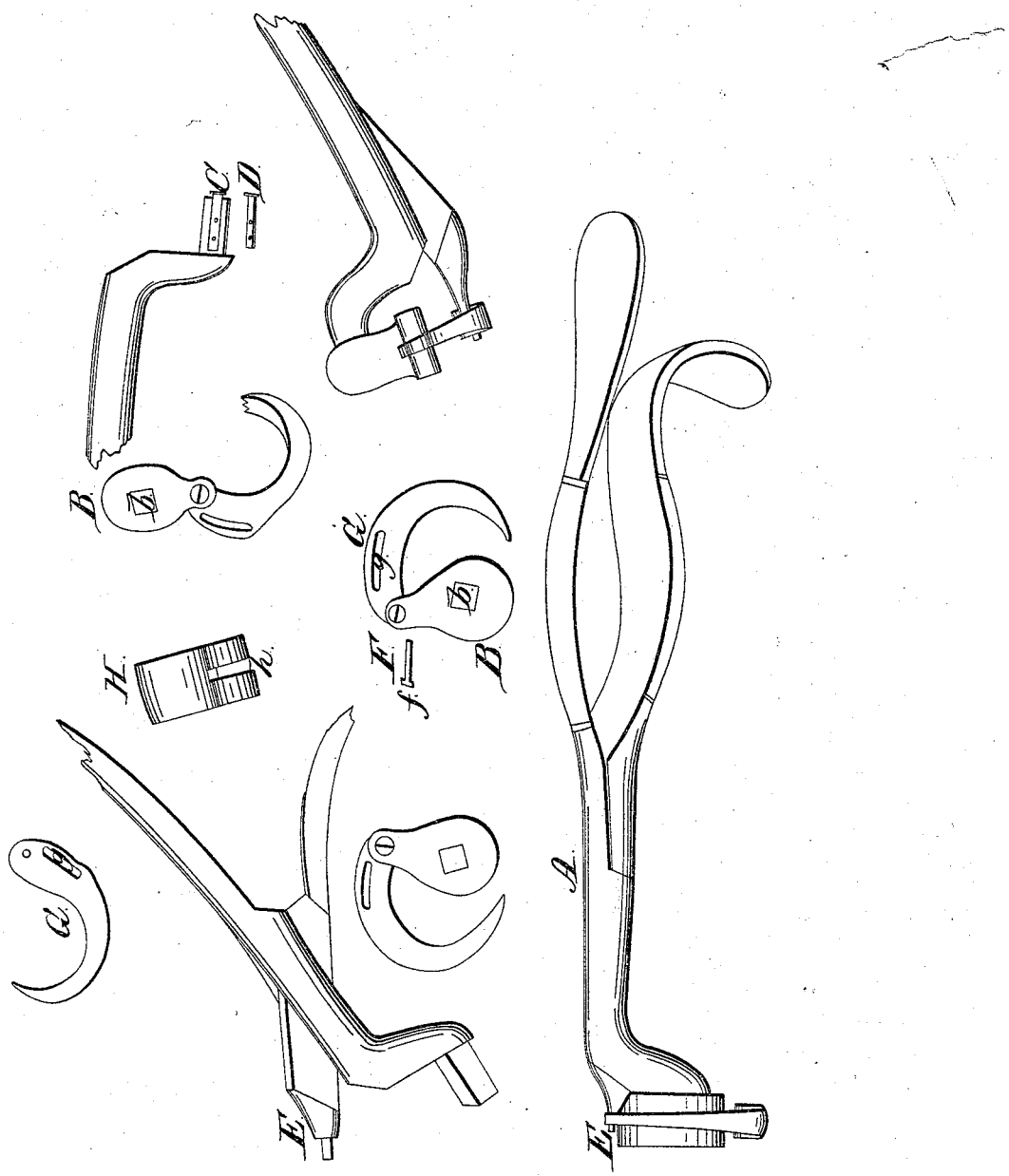

J. W. BAKER AND W. W. RILEY, OF COLUMBUS, OHIO.

INSTRUMENT FOR EXTRACTING TEETH.

Specification of Letters Patent No. 4,261, dated November 8, 1845.

*To all whom it may concern:*

Be it known that we, JOHN WILSON BAKER and WILLIAM WILLSHIRE RILEY, of the city of Columbus, county of Franklin, and State of Ohio, have invented a new and Improved Instrument for Extracting Teeth, called a "Hook-Controlling Forceps-Key," and do hereby declare that the following is a full and exact description.

The nature of our improvement consists in applying lever power to the hook, either by forcep handles, as in the accompanying drawing, or by a spring or other known means, so as to give the operator complete control of the hook.

To enable others skilled in the art to make and use our invention we describe its construction and operation, as follows: We construct a pair of forcep handles and joint, as represented in the accompanying drawing letter A, or any of the known forms. The bulb, or fulcrum is made about three fourths of an inch long by half an inch thick and in shape resembling a pear at side view, letter B. It is pierced with a small hole for the rivet or screw near the top, and a square mortise near the lower extremity nearest to one side and in such a manner that when placed on the square end of the handle C, the rivet or connecting point between the bulb and hook, will stand obliquely to the right or left of a vertical line from either side of the square mortise b, and has a transverse cut or groove to receive the end of the hook letter G, as at H, h, and is confined to the handle square C, by a small spring, set into the square tenon c with a catch on the outer end upward, letter D.

The point or beak of the handle which controls the hook is made round, about one eighth of an inch long, to a square shoulder, which forms a guide for the hook, is about one sixteenth of an inch in diameter, or suited to the size of the mortise in the hook, letter E.

The hook, is of the usual form at the point, but made wide enough to admit of the mortise, which is about one sixteenth of an inch wide, and three eighths of an inch long, or longer if required, letters; G, g, and is attached to the bulb or fulcrum by a screw or rivet, letters F, f, and is controlled by means of the beak E passing through the mortise g, by which we are enabled to prevent the hook from slipping from the tooth, while turning it out or lifting it from its socket, as with a pair of forceps and can grasp any tooth, which with the key now in use it is extremely difficult to do, by reason of having to introduce the finger into the mouth for placing the hook, upon the tooth which often occasions the unskilful operator to extract a wrong one.

What we claim as our invention and desire to secure by Letters Patent is—

The combination of the forceps handles with the manner of controlling the hook substantially in the manner and for the purpose described.

JOHN W. BAKER.
WILLIAM WILLSHIRE RILEY.

Witnesses:
JAMES WATSON RILEY,
NELSON GATES,
THOS. I. COULTER,